United States Patent Office 2,899,517
Patented Aug. 11, 1959

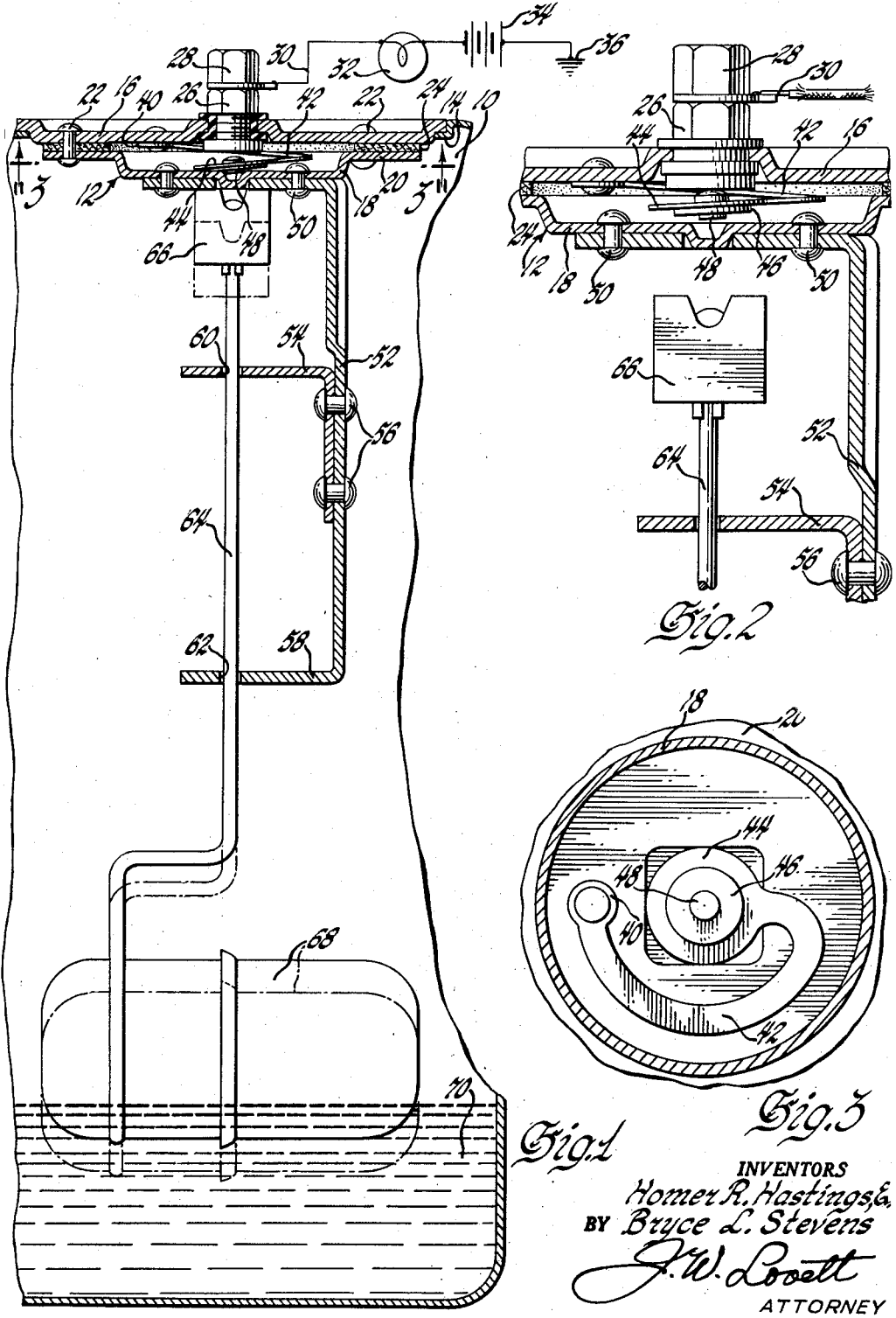

2,899,517

LIQUID LEVEL SIGNAL ARRANGEMENTS

Homer R. Hastings, Flint, and Bryce L. Stevens, Davison, Mich., assignors to General Motors Corporation, Detroit, Mich., a corporation of Delaware Application October 8, 1956, Serial No. 614,560

1 Claim. (Cl. 200—84)

This invention relates to signal arrangements and more particularly to arrangements involving switches operated to signal the attainment of a liquid level in a tank.

A need has existed for a reliable and rugged device capable of signaling the attainment of a predetermined liquid level in a tank. In many instances or types of installations the signal may rarely be used; but when or if ever needed, it should perform its service effectively. An operator of a motor vehicle, for example, may rarely permit his fuel supply to reach a dangerously low level; but he nevertheless and obviously would appreciate a device which would give him a clear warning as by a light or sound effect if an oversight or emergency should cause such level to be reached.

To this end, an object of the present invention is to provide an improved signal arrangement of simple construction which is effective upon attainment of a predetermined liquid level in a tank to close an electrical circuit actuating a signal. Another object is to provide a low cost signal arrangement which is normally ineffective and is capable of automatically operating when a low liquid level in a tank is reached.

A feature of the invention pertains to a float-actuated magnetic body arranged to effect closure of a normally open switch when a predetermined liquid level is attained. Another feature is a normally open switch located in a non-magnetic housing associated with a tank and in a signal circuit, the arrangement being in combination with a float actuated magnetic body for closing the switch when a predetermined liquid level in the tank has been reached. Another feature is a switch arrangement and a float for a sealed tank, the switch arrangement being spring loaded toward its closed position and including two magnetic and mutually attracted bodies, one of the bodies being movable with the float and the other being movable into closed and open switch positions controlling a signal circuit.

These and other important features of the invention will now be described in detail in the specification and then pointed out more particularly in the appended claim.

In the drawings:

Fig. 1 diagrammatically illustrates a signal circuit and depicts a vertical sectional view through a float controlled switch shown in its normally open position and in which switch arrangement the present invention is embodied;

Fig. 2 is an enlarged view of a portion of the structure shown in Fig. 1, the switch being in its closed position to impart a signal; and Fig. 3 is an enlarged sectional view looking in the direction of the arrows 3—3 in Fig. 1.

In adapting the present invention to an actual field of use, the drawings show one embodiment of the invention as installed in the fuel tank 10 of an automobile.

A housing 12 is shown as fixed in a recessed portion 14 of the top wall of the tank and this housing comprises a top cover 16 which is fixed to the tank by means not shown. The housing also includes a shallow inner brass cup member 18, the annular flange 20 of which is fixed to the plate 16 by means of rivets 22 with a sealing gasket 24 interposed. The center of the cover plate 16 is apertured tightly to receive a terminal 26 which is insulated from the plate 16 and extends into and terminates within the housing. The upper end of the terminal is fitted with a nut 28 for proper connection to a line 30 forming part of a signal circuit. As illustrated, this circuit comprises a light bulb 32, battery 34 and a ground 36. In the case of a vehicle, this ground 36 may be the frame of the vehicle to which the cover plate 16 and tank 10 are also grounded. To one side of the terminal 26 and on the cover 16 is fixed one end of a curved spring member 42. The latter partially encircles the extended axis of the terminal 26 and then projects inwardly to terminate with a circular flat portion 44 which is approximately coaxial with the terminal. A washer 46 is fixed to the underside of the portion 44 by means of a contact rivet 48. The washer 46 is of soft iron constituting a magnetic body or armature. The spring 42 is loaded constantly to urge the magnetic body 46 toward contact with the end of the terminal 26. When the spring 42 is effective, the rivet 48 serves as a contact in its closed position, as shown in Fig. 2. The washer 46 and the spring member 42 may be taken together as constituting a switch contact portion.

Attached to and suspended from the bottom of the housing 12 by means of rivets 50 is a bracket 52 having a U-shape. An angle bar 54 is fixed to an intermediate portion of the bracket 52 by means of rivets 56 to form a portion parallel with a lower flange 58 of the bracket. Coaxial openings 60 and 62 are formed in the angle bar 54 and the portion 58 in alignment with the terminal 26 and the magnetic body 46.

Slidably held within the openings 60 and 62 is a rod 64 connecting a second magnetic body in the form of a permanent magnet 66 with a float 68. The float is at one end of the rod 64 for immersion in the fluid 70 of the tank. The magnet 66 is at the other end of the rod and is arranged to move a short distance into and away from a zone immediately below the housing 12 in which the magnetic field of the magnet influences the magnetic body or armature 46.

A time delay in the movement of the armature 46 and rivet or contact 48 is provided by partially filling the housing 12 with a silicone fluid. This prevents flickering of the light signal 32 as the level of the liquid 70 approaches the level at which the warning occurs.

The principle of operation of the signal arrangement illustrated is quite simple. If the tank 10 has an appreciable amount or high level of liquid in it, the float 68 will rise and cause the magnet 66 to remain in its uppermost position against the upper flange of the bracket 52, as shown in full lines in Fig. 1. As a result, the magnetic attraction of the magnet will cause the body or armature 46 to be pulled down against the action of the spring 42 holding the signal circuit open and the light bulb 32 will not be illuminated.

Assuming, however, that the liquid level in the tank is in the process of dropping to a predetermined low level, the float 68 will not lower until the critical or predetermined low level range is reached justifying a signal. When such low level is reached, the magnet 66 will be caused to lower a short distance into its dot-and-dash position shown in Fig. 1. This distance need not be great but only adequate to weaken the magnetic pull on the body 46 and permit the spring 42 to establish contact with the lower end of the terminal 26, as illustrated in Fig. 2. This will close the signal circuit and the light 32 will be illuminated thereby indicating that the supply of liquid in the tank 10 is dangerously low.

When the liquid supply is replenished, a departure of the liquid level from the predetermined low level will cause a slight upward movement of the magnet 66 until the magnetic force is sufficiently effective to overcome the spring 42 and again open the signal circuit.

It is obvious that some other device such as a bell, buzzer or colored indicator may be substituted for the electric light bulb 32 without departing from the present invention, and it is also to be noted that the magnetic bodies 46 and 66 are preferably arranged and illustrated with the body exterior to the housing 12 constituting the magnet. The design could be such that the magnet comprises part of the electrical contact and the cooperating body supported on the end of the bar 64 could be an armature of soft iron. In such a case the terminal 26 should be non-magnetic. Regardless of the relative positioning or reversal of the two magnetic bodies 46 and 66 it will be seen that the signal arrangement serves to close the signal circuit to warn the user of the attainment of a predetermined liquid level. By suitably linking the float 68 to the magnetic body 66 the arrangement may be utilized to indicate a high or intermediate level of liquid in the tank.

It should be noted that the present design is particularly adapted for use in connection with the fuel tank of an automobile or any storage tank for liquids which are inflammable or explosive in nature since the housing for the movable contact rivet 48 is sealed by the gasket 24 and no explosive fumes within the tank can enter this housing where they might be ignited by a spark or arc upon closing or opening the circuit between contact rivet 48 and terminal 26.

We claim:

A switch arrangement adapted to be supported on a substantially horizontal top wall of a tank, said arrangement including a housing of non-magnetic material with a peripheral flange for joinder to the margin of an opening in said wall, a switch enclosed in said housing and including a first magnetic body and spring means located beneath said flange, said spring means urging the said first body in a vertical direction into one switch position, a second magnetic body below said housing, a float below said housing, a rod connecting said float and second magnetic body for vertical and unitary movement, one of said bodies being permanently magnetized, a bracket fixed to said housing and arranged to guide said rod during said movement, and the arrangement being such that upward movement of the said float will cause relative movement of said bodies into their field of mutual attraction to change the position of said switch against the force of said spring and downward movement of said float will release said first magnetic body from the magnetic attraction existent between said bodies and cause the action of said spring means to be effective in moving the said first body.

References Cited in the file of this patent

UNITED STATES PATENTS

| | | |
|---|---|---|
| 383,946 | Ghegan | June 5, 1888 |
| 2,116,415 | Shenton | May 3, 1938 |
| 2,236,360 | Beam | Mar. 25, 1941 |
| 2,264,058 | Vigren et al. | Nov. 25, 1941 |
| 2,300,300 | Lund | Oct. 27, 1942 |
| 2,495,149 | Taylor | Jan. 17, 1950 |